United States Patent [19]
Friedline

[11] 3,918,826
[45] Nov. 11, 1975

[54] BORING TOOL HAVING RETRACTABLE CARTRIDGE

[75] Inventor: Ernest J. Friedline, Latrobe, Pa.

[73] Assignee: Kennametal Inc., Latrobe, Pa.

[22] Filed: Aug. 22, 1974

[21] Appl. No.: 499,448

[52] U.S. Cl. ............... 408/154; 408/168; 408/180; 408/714
[51] Int. Cl.² ......................................... B23B 29/14
[58] Field of Search .......... 408/168, 161, 163, 153, 408/154, 155, 156, 158, 159, 165, 169, 170, 171, 180, 714

[56] References Cited
UNITED STATES PATENTS

| | | | |
|---|---|---|---|
| 2,998,737 | 9/1961 | Yogus et al. | 408/153 |
| 3,274,861 | 9/1966 | Czubak | 408/180 |
| 3,276,101 | 10/1966 | Plein | 408/156 X |
| 3,530,745 | 9/1970 | Milewski | 408/158 |
| 3,740,161 | 6/1973 | Milewski | 408/168 X |

*Primary Examiner*—Frank T. Yost
*Attorney, Agent, or Firm*—Melvin A. Crosby

[57] ABSTRACT

A boring tool comprising a holder and a cartridge mounted in the holder which is laterally adjustable therein by a cam. The holder is preferably in the form of an elongated bar and the cartridge carries an insert protruding laterally from the bar at one end and the adjustment of the cartridge laterally of the bar is accomplished by a threaded member extending completely through the bar in the longitudinal direction.

10 Claims, 13 Drawing Figures

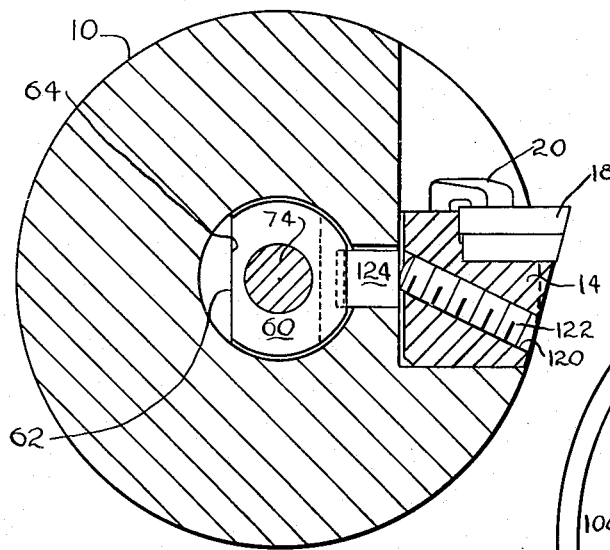
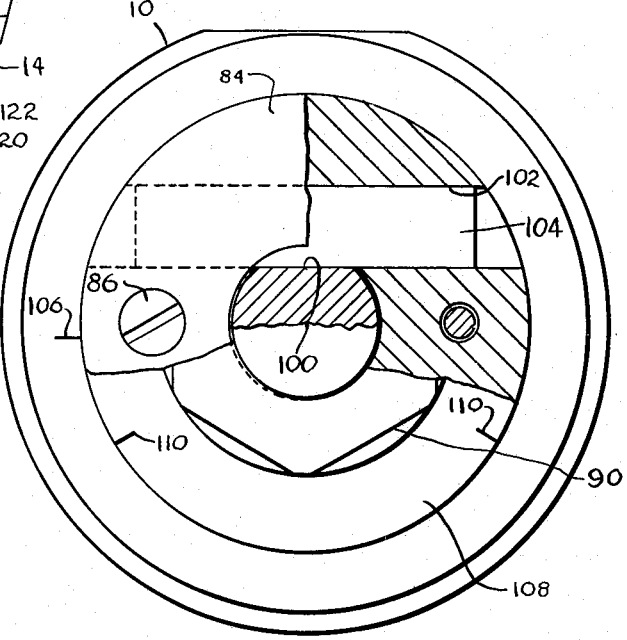
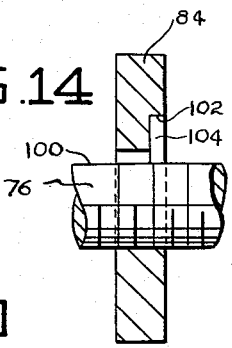
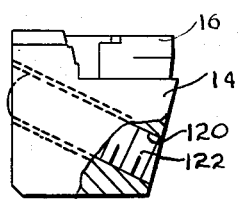
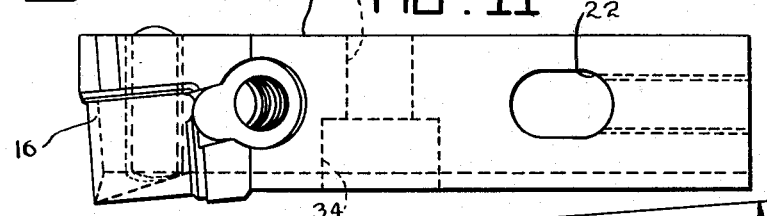
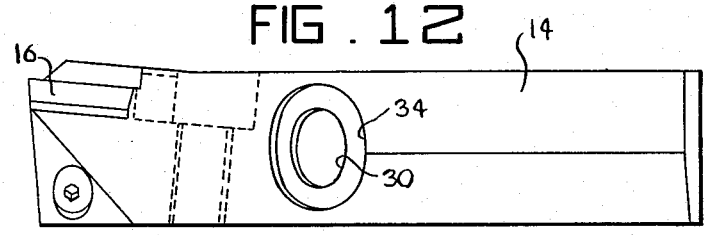
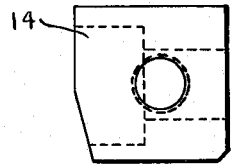

BORING TOOL HAVING RETRACTABLE CARTRIDGE

The present invention relates to a boring tool, especially a boring bar, in which a cutting element is mounted on the cartridge on one end of the bar and is laterally adjustable thereon.

Boring tools, such as boring bars, are well known and are employed for finishing the insides of holes and work members in order to bring the holes to the desired size. On occasion, it is desired to have an extremely accurately sized hole free of tool marks thereon, and for producing such a hole, it is necessary to retract the cutting element of the tool from the surface being machined when the tool is withdrawn from the hole.

The present invention is particularly concerned with a boring bar constructed and arranged for accomplishing fine finish turning of the inside of a hole and for eliminating tool marks formed in the hole when the boring bar and cutting element are retracted therefrom.

BRIEF SUMMARY OF THE INVENTION

According to the present invention, a boring bar is provided adapted for being clamped in a tool holder or the like in a machine tool so that the forward end of the boring bar projects outwardly from the tool holder while the rearward end of the boring bar is exposed.

The forward end of the boring bar has a lateral notch formed therein and a cartridge in the form of a bar substantially shorter than the boring bar is mounted in the notch. At the axially outer end of the cartridge, a pocket is formed in which a cutting insert is mounted. The cartridge is connected to the boring bar near the end of the cartridge opposite the pocket and the cartridge is so constructed that the pocket end thereof will be yieldable in the lateral direction, i.e., substantially parallel to the bottom of the insert pocket formed therein.

The insert end of the cartridge is engaged by a cam arrangement in the boring bar which is operable for effecting lateral adjustment of the insert end of the cartridge on the boring bar. The cam arrangement is adjustable by a bolt extending axially through the boring bar and adjustable from the rearward end of the boring bar.

The cam arrangement permits fine adjustment of the insert end of the cartridge in the lateral direction on the boring bar and the bolt extending through the boring bar and by means of which the cam arrangement is adjusted, it is provided with graduation means at the rearward end of the boring bar so that the precise position of the insert end of the cartridge can be determined.

The described boring tool permits extremely fine adjustment of the insert to provide for precise sizing of holes being finish bored and, also, permits adjustment of the insert on the boring bar away from the surface being worked so that the boring bar together with the insert can be retracted from the workpiece without forming tool marks in the finished hole.

The exact nature of the present invention will become more clearly apparent upon reference to the following detailed specification taken in connection with the accompanying drawings in which:

FIG. 8 is a transverse section drawn at enlarged scale and is indicated by section line VIII—VIII on FIG. 1.

FIG. 9 is another transverse section drawn at enlarged scale and indicated by section line IX—IX of FIG. 1.

FIG. 10 is an end view of the insert supporting cartridge looking in at the pocket end thereof.

FIG. 11 is a plan view of the cartridge.

FIG. 12 is a side view of the cartridge.

FIG. 13 is a rear end elevational view of the cartridge.

FIG. 14 is a sectional view showing a ring which is mounted on the rearward end of the boring bar and which includes a key to prevent the adjusting bolt in the boring bar from rotating therein.

DETAILED DESCRIPTION OF THE INVENTION

Figure 1:
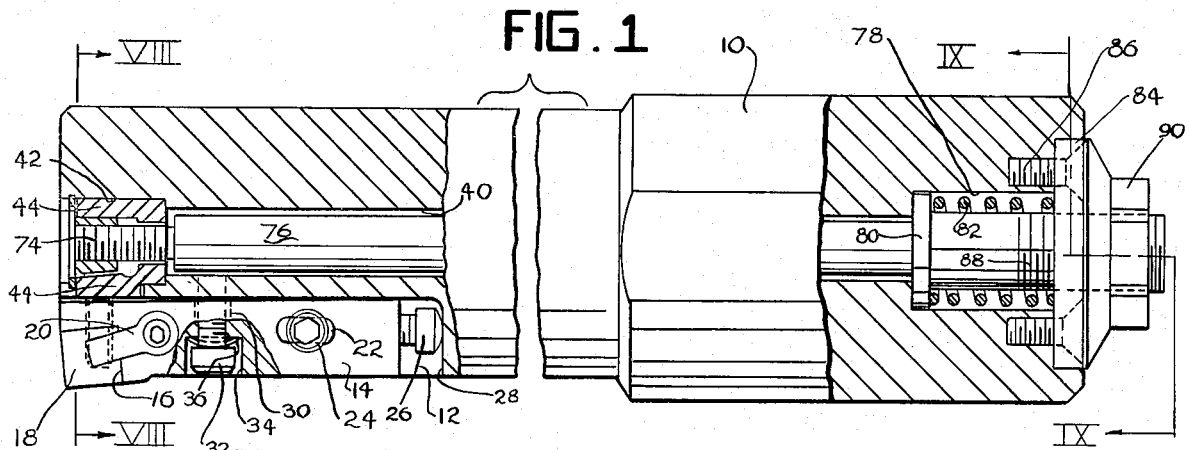
FIG. 1 is a side view partly broken away showing a boring bar according to the present invention.
Figure 2:
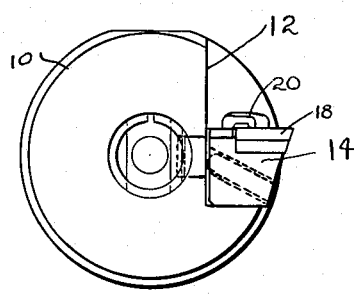
FIG. 2 is a view looking in at the left end of FIG. 1 showing the notch in the outer end of the boring bar and the cartridge mounted therein.

Referring to the drawings somewhat more in detail, in FIG. 1, 10 indicates an elongated boring bar which may be formed of steel and which, at the rightward end, is adapted for being clamped in the tool holder of a machine tool while, at the leftward end, the boring bar is formed with a lateral notch 12, the configuration of which will best be seen in FIG. 2.

Seated in notch 12 is a cartridge 14, and the cartridge, at the axially outer end, is formed with a pocket 16 adapted for receiving a cutting insert 18 which is fixedly clamped in the pocket as by clamp member 20 carried by the cartridge.

The cartridge 14 has an elongated hole 22 therein through which a clamp bolt 24 extends for clamping the cartridge in pocket 12. Bolt 24 and elongated hole 22 are disposed near the rearward end of the cartridge so that the forward, or insert, end thereof can be adjusted laterally on the bar 10.

An adjustment screw 26 is threaded into the rearward end of cartridge 14 and abuts the rearward wall 28 of pocket 12 and is provided for adjusting the fore and aft position of the cartridge on the boring bar.

Between the insert pocket 16 and clamp bolt 24 the cartridge is provided with a lateral hole 30 and a cap screw 32 is provided extending through the hole and threaded into the bar 10. The head of cap screw 32 is disposed in a counterbore 34 and between the underside of the head of cap screw 32 and the bottom of counterbore 34 there is interposed a spring washer 36. Cap screw 32 is loosely received in the bore 30 and in the counterbore so that longitudinal adjustment of the cartridge 14 in pocket 12 is not interferred with.

The boring bar 10 is provided with a longitudinally extending through bore 40 which, at the forward end of the boring bar, namely, the cartridge end thereof, is counterbored as at 42 for receiving a member 44 which is loosely retained in counterbore 42 as by a snap ring 46 adjacent the mouth of the counterbore.

Figure 5:
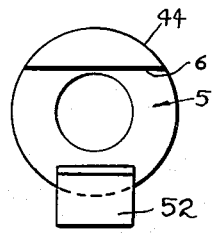
FIG. 5 is an end view showing a member having a yieldable follower part which is interposed between the cam member of FIGS. 3 and 4 and the cartridge.
Figure 6:
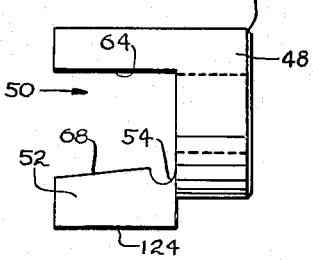
FIG. 6 is a side view of the member of FIG. 5.
Figure 7:
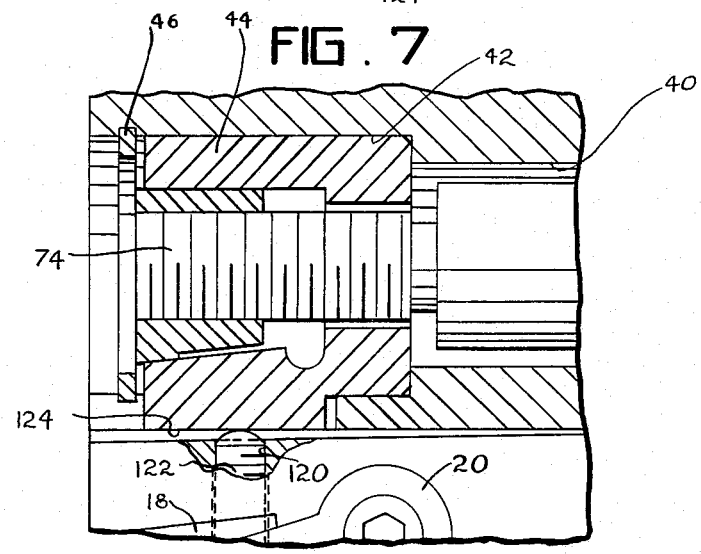
FIG. 7 is a longitudinal section drawn at enlarged scale and showing more in detail the positioning of the cam member and the cooperating member having the yieldable follower.

The member 44, as will best be seen in FIGS. 5, 6 and 7, has a cylindrical rearward end 48 and extending inwardly from the forward side is a slot 50 with the bottom of the slot defined by a forwardly projecting portion 52 extending forwardly from cylindrical portion 48 and reduced in width, as will be seen in FIG. 5, and connected to the forward side of cylindrical portion 48 by a reduced section region 54.

The reduced section region 54 provides for lateral yieldability of portion 52 which is by way of being a cam follower and the actuator for moving the cartridge laterally on the boring bar. It will be noted that the surface of member 52 facing inwardly of slot 50 is inclined to the longitudinal axis at an angle of about 3 ½°.

Figure 3:
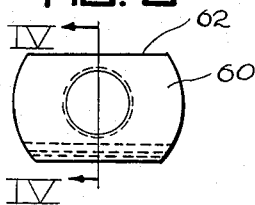
FIG. 3 is an end view of the cam member which is employed for adjusting the cartridge on the boring bar.
Figure 4:
FIG. 4 is a longitudinal section through the cam member indicated by line IV—IV on FIG. 3.

Fitted into slot 50 is a cam member 60, the configuration of which will best be seen in FIGS. 3, 4 and 7. Cam member 60 has a flat surface 62 on one side engageable with the flat axial surface 64 on the one side of the slot while on the opposite side cam member 60 has a nose portion 66 engageable with the inclined inwardly facing surface 68 of portion 52 of the follower member.

The nose portion 66 of the cam member is relatively short in the axial direction and the cam member is relieved rearwardly of the nose portion as indicated at 70. The cam member is centrally bored and threaded at 72 and threadedly engages the threaded end 74 of a bolt or draw rod 76 extending axially through central bore 40 of the boring bar.

At the rearward end of the boring bar, which is the right end in FIG. 1, bore 40 is counterbored as at 78 and draw rod 76 has a collar 80 thereon engageable with the bottom wall of counterbore 78. A compression spring 82 bears between the rightwardly facing side of collar 80 and a ring 84 secured to the rearward end of boring bar 10 by screws 86.

The rearward end of draw rod 76, and which may be somewhat larger in diameter than the portion that extends along bore 40, is provided with threads 88 and threaded thereon outside ring 84 is a nut 90.

The enlarged portion of the draw rod, in at least the region that is moveable through ring 84, is flatted on one side and is indicated at 100 in FIG. 9, and ring 84 is transversely slotted as at 102 and pressed into the slot is a bar 104 which engages flatted region 100 of the draw bar and prevents rotation thereof in the boring bar whereby rotation of nut 90 will cause axial movement of the draw bar in the boring bar but will not cause rotation of the draw bar in the boring bar.

The boring bar, at the rearward end, is provided with at least one index mark 106 and the flange 108 of nut 90 is similarly provided with at least four index marks 110 thereon adapted for variable registration with index mark 106.

The arrangement is such that with about 20 threads per inch on bolt or draw bar 76, and with about 4 ½° inclination on the follower portion of the member 44, lateral movement of the follower member in response to rotation of nut 90 will be about .001 for each quarter turn of nut 90.

The cartridge 14 referred to above is illustrated in some detail in FIGS. 10 through 13 and will be seen to comprise a substantially rectangular block of steel having the insert pocket 16 formed in one end thereof for receiving the insert 18.

Advantageously, the cartridge, in addition to the bore for receiving cap screw 32 and the threaded bore for receiving abutment screw 26, and the threaded bore for receiving the screw for the clamp member 20, also has an inclined laterally extending threaded bore 120 for receiving an adjustable abutment screw 122 which is adapted for adjustment into abutting engagement with the outwardly facing side of the cam follower portion of member 44. This outwardly facing side is indicated at 124 in FIG. 6.

In operation, rotation of nut 90 in one direction will cause axial movement of draw rod 76 leftwardly as it is viewed in FIG. 1, and this will cause the cam and follower arrangement to be displaced radially inwardly which will permit the outer or insert end of cartridge 14 to move laterally inwardly under the influence of spring washer 36.

If the insert 18 is at the end of a hole that has just been finish bored, this retraction of the cartridge and insert toward the center of the boring bar will permit the boring bar with the cartridge and insert to be retracted from the hole without making a tool mark thereon. Return of the nut 90 back to its original position will restore the elements of the cam and follower to the original position thereof and will move the cartridge at the insert end back to the original position thereof.

Further, fine adjustments can be made in the position of the insert by manipulation of nut 90 in one direction or the other and the illustrated arrangement permits the particular adjustment of the cartridge on the boring bar to be recaptured at any time.

Modifications may be made within the scope of the appended claims.

What is claimed is:

1. In a boring tool; a support bar having a forward end and a rearward end, a lateral notch formed into the side of the bar at the forward end, a cartridge in said notch having a longitudinal axis and formed with a pocket for a cutting insert at the end nearest said forward end of the bar and on the radially outer side of the cartridge, said pocket having a bottom wall for supporting a cutting insert disposed in said pocket, connecting means spaced longitudinally along the cartridge from the pocket end thereof connecting the cartridge to the bar, radially acting cam and follower means in said bar adjacent said notch at said forward end thereof operatively engaging the cartridge near the pocket end thereof and adjustable longitudinally of said bar for effecting radial adjustment of the pocket end of the cartridge on said bar in a direction substantially parallel to said bottom wall of said pocket, adjustable means extending axially through said bar and connected to said cam and follower means for effecting adjustment thereof, and resilient means acting on said cartridge between said pocket end thereof and said connecting means, and biasing the cartridge in the radially inward direction on said bar.

2. A boring tool according to claim 1 which includes an adjustable abutment screw extending laterally through said cartridge and abutting said cam and follower means.

3. A boring tool according to claim 1 in which said connecting means includes screw threaded clamping means extending through said cartridge in a direction perpendicular to the longitudinal axis of the cartridge and threaded into said bar, a longitudinal slot in the cartridge through which said cap screw passes, and a longitudinally extending abutment screw threaded into the end of said cartridge which is opposite the pocket end thereof and engaging said bar at the axially inner end of said notch.

4. A boring tool according to claim 1 in which said cam and follower means includes a first member mounted in the forward end of said bar and having a laterally yieldable portion on the cartridge side thereof, said yieldable portion having an inclined surface on the side facing away from said cartridge which is inclined to the axis of said bar, and a second member engaging said inclined surface and axially adjustable in said bar.

5. A boring tool according to claim 4 in which said first member includes an axial surface in spaced opposed relation to said inclined surface, said second member fitting between said axial surface and inclined surface, said bar including a slot opening into said notch in which said yieldable portion is disposed and by means of which said yieldable portion is located in cartridge engaging position.

6. A boring tool according to claim 1 in which said cam and follower means comprise a follower member in the forward end of said bar on the axis thereof, a slot in the bar opening into said notch, said follower member having a laterally yieldable portion in said slot, said portion having a surface on the side facing away from said cartridge which is inclined to the axis of the bar, said cam and follower means also including a cam member engaging said inclined surface, said adjusting means including a rod extending axially through said bar and at one end connected to said cam member and at the other end connected to the rearward end of said bar, and screw threaded means at the rearward end of said bar for effecting axial adjustment of said rod and cam member in said bar.

7. A boring tool according to claim 6 in which said screw threaded means comprises a nut threaded on the rod at the rearward end of the bar, and means for holding said rod against rotation in said bar while permitting axial movement of the rod in the bar.

8. A boring tool according to claim 6 which includes spring means urging said rod in a direction to retract said yieldable portion of said follower member radially inwardly on said bar, and said resilient means comprising a spring biasing said cartridge in the radially inward direction on said bar.

9. A boring tool according to claim 8 in which said bar is longitudinally bored and counterbored at each end, said cam and follower means being disposed in the counterbore at the forward end of the bar, said rod having a collar in the counterbore at the rearward end of the bar, a closure ring on the bar at the rearward end, said spring means bearing between said collar and the inner side of said closure ring, said screw threaded means comprising a nut threaded on said rod and engaging the outer side of said closure ring, and key means holding said rod against rotation in said closure ring while permitting axial movement of the rod therein.

10. A boring tool according to claim 9 in which said key means comprises a flatted region on said rod in the axial range of said closure ring, and a bar key carried by said closure ring and engaging said flatted region.

* * * * *